United States Patent
Beauvais et al.

(10) Patent No.: US 10,033,729 B2
(45) Date of Patent: Jul. 24, 2018

(54) DYNAMIC PHRASE BASE AUTHENTICATION SYSTEM

(71) Applicant: International Business Machines Corporation, Armonk, NY (US)

(72) Inventors: John B. Beauvais, Poughkeepsie, NY (US); Michael J. Turek, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 15/099,235

(22) Filed: Apr. 14, 2016

(65) Prior Publication Data
US 2017/0302647 A1    Oct. 19, 2017

(51) Int. Cl.
*H04L 29/06* (2006.01)
*G06F 17/27* (2006.01)

(52) U.S. Cl.
CPC ........ *H04L 63/083* (2013.01); *G06F 17/2705* (2013.01); *H04L 63/06* (2013.01)

(58) Field of Classification Search
CPC ....... H04L 63/083; H04L 63/06; H04L 63/10; H04L 9/3236; H04L 9/0643; H04W 12/06; G06F 21/31; G06F 17/2705; G06F 17/3033
USPC ........................................................... 726/6
See application file for complete search history.

(56) References Cited

U.S. PATENT DOCUMENTS

| | | | |
|---|---|---|---|
| 7,293,282 B2 | 11/2007 | Danforth et al. | |
| 8,763,096 B1 | 6/2014 | Hernacki et al. | |
| 2003/0046533 A1* | 3/2003 | Olkin | H04L 51/30 713/152 |
| 2006/0206919 A1 | 9/2006 | Montgomery et al. | |
| 2015/0033303 A1* | 1/2015 | VanBlon | G06F 21/46 726/6 |

FOREIGN PATENT DOCUMENTS

| | | |
|---|---|---|
| CA | 2370756 A1 | 7/2003 |
| WO | 2007036763 A1 | 4/2007 |

OTHER PUBLICATIONS

C. Newman et al., "The One-Time-Password SASL Mechanism," IP.com No. 000003022, Sep. 13, 2000 (electronic publication date), Copyright © The Internet Society (1998), 7 pages.

Johnson M. Hart, "Right and Left Parses in Phrase Structure Grammas," Technical Report No. 20-75 Revised, IP.com No. 000151753, Apr. 23, 2007 (electronic publication date), Copyright © Software Patent Institute, 30 pages.

* cited by examiner

*Primary Examiner* — Yogesh Paliwal
(74) *Attorney, Agent, or Firm* — Patterson + Sheridan, LLP

(57) ABSTRACT

Techniques are disclosed for authenticating a user. One technique includes receiving a passphrase at a server. The technique further includes parsing the passphrase using one or more parsing requests to create one or more parsings. The technique includes storing the one or more parsings on the server. The technique also includes receiving, at the server, a request from a user to authenticate the user. Finally, the technique includes transmitting a first parsing request to authenticate the user.

14 Claims, 4 Drawing Sheets

DYNAMIC PHRASE BASE AUTHENTICATION SYSTEM

BACKGROUND

The present disclosure generally relates to computer systems, and more specifically, to authentication systems.

One method for authenticating a user is for the user to enter a username and password in order to gain access to a system or resources. However, strong passwords are needed to prevent unauthorized access. The use of dictionary words as part of a password can weaken a password. A weak password may be guessed by an unauthorized user or determined by a computer program utilizing a brute force approach. Strong passwords, however, are often difficult to create and remember. Mnemonic passwords are passwords that are created by concatenating letters of a sentence in a memorable way. Mnemonic passwords may be easier to remember than other types of passwords, but they are static and can also be vulnerable to brute force or man-in-the-middle attacks.

SUMMARY

One embodiment presented herein discloses a method for authenticating users. The method includes receiving a passphrase at a server. The method further includes parsing the passphrase using one or more parsing requests to create one or more parsings. The method includes storing the one or more parsings on the server. The method also includes receiving, at the server, a request from a user to authenticate the user. Finally, the method includes transmitting a first parsing request to authenticate the user.

Other embodiments include, without limitation, an authentication system having a processor, memory, and application programs configured to implement one or more aspects of the disclosed methods. A memory stores a program, which, when executed on the processor, performs an operation for authenticating users. The operation includes receiving a passphrase at a server. The operation further includes parsing the passphrase using one or more parsing requests to create one or more parsings. The operation includes storing the one or more parsings on the server. The operation also includes receiving, at the server, a request from a user to authenticate the user. Finally, the operation includes transmitting a first parsing request to authenticate the user.

Other embodiments include, without limitation, a computer program product that includes a computer readable storage medium having computer-readable program instructions that enables a processing unit to implement one or more aspects of the disclosed methods. The program instructions are executable by a processor to cause the processor to receive a first passphrase at a server. The instructions are also executable by a processor to cause the processor to parse the passphrase using one or more parsing requests to create one or more parsings. The instructions are further executable by the processor to cause the processor to store the one or more parsings on the server. The instructions are further executable by the processor to cause the processor to receive, at the server, a request from a user to authenticate the user. Finally, the instructions are further executable by the processor to cause the processor to transmit a first parsing request to authenticate a user.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
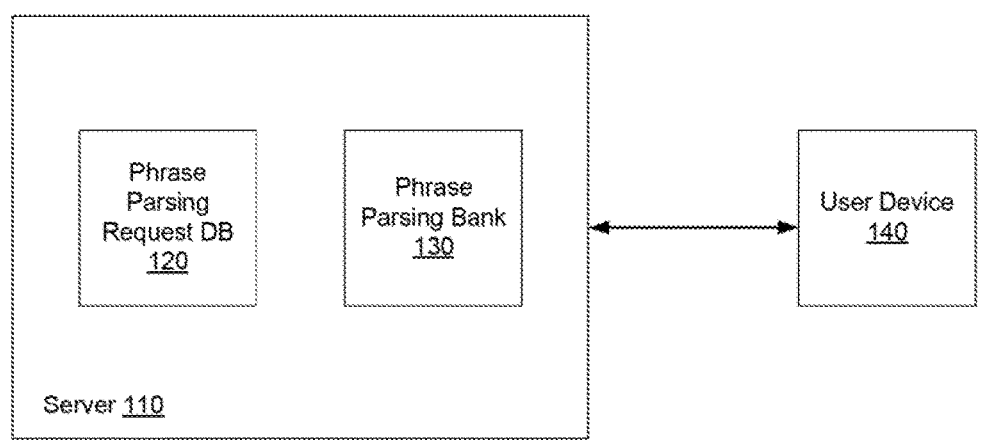
FIG. 1 illustrates an example computer system for authenticating a user, according to one embodiment.

Embodiments presented herein disclose hardware and software means to authenticate a user. Mnemonic passwords are easier to remember than other types of passwords, but they can be vulnerable to brute force or man-in-the-middle attacks. Embodiments described herein provide for mnemonic passwords that are effectively rotating. That is, the password is a mnemonic password that changes each time a user is asked to authenticate himself or herself. A user chooses a passphrase and that passphrase is parsed in a number of ways by an authentication server to create a resulting list of mnemonics. Then, each time the user attempts to log in, the user is asked for one of the parsings of the passphrase instead of for the entire passphrase. Each parsing is different, and therefore each password that is entered to authenticate the user will be different. A parsing, or a parsing request, is a human readable sentence asking the user to provide some specific information about the user's passphrase. For example, one parsing request may ask the user to enter the first letter of each word in the passphrase.

Because each parsing request is unique, the rotating quality of the parsing requests protects against brute force attacks because a guess for one authentication attempt reveals very little to no information for the next attempt. Additionally, the rotating quality guards against man-in-the-middle attacks. If a third party intercepts the phrase parsing request and the response of a successful authentication attempt, only a small portion of the initial passphrase is revealed, leaving the actual passphrase secure.

Embodiments described herein provide a rotating password without requiring a secondary device (such as a key fob) to provide a one-time use authentication key.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

FIG. 1 illustrates an authentication system 100 according to an embodiment. Authentication system 100 includes a server 110 and a user device 140. The server 110 may be used by a service provider to authenticate users that utilize a user device 140. Server 110 provides authentication services with phrase parsing request database 120 and phrase parsing bank 130. User device 140 could comprise a desktop computer, laptop computer, tablet computer, smartphone, or any other device that a user may use to access a service that requires authentication.

Phrase parsing request database 120 stores the phrase parsing requests that are used to parse the phrase provided by the user. Any number of phrase parsing requests may be stored in database 120. Phrase parsing bank 130 stores a table that includes the phrase parsing requests (or an identifier associated with those phrase parsing requests) and the results of those parsings on the phrases provided by the users of system 100. These components are described in further detail below.

In brief, the authentication system described herein works as follows. When a user creates an account, the service provider of the service the user is signing up for asks the user to enter a passphrase. Ideally, this is a relatively long passphrase that the user can remember easily. The service provider may enforce any number of requirements on the phrase. For example, the service provider may require that the passphrase satisfies a minimum word count. As another example, the service provider may require that enough words in the passphrase satisfy a minimum word length. As yet another example, the service provider may require that the entire passphrase meets a minimum character length. Any other suitable requirements may be implemented by the service provider.

Once the service provider has received the user's passphrase, server 110 parses the phrase using each of the phrase parsing requests in phrase parsing request database 120. Each phrase parsing requests parses the passphrase in a unique way. The result of each of those parsings is stored in phrase parsing bank 130. The service provider may also enforce any number of requirements on the phrase parsing results. As an example, the phrase parsing results may be required to have a minimum length. Phrase parsing results that do not meet the requirements may be discarded. If so, those phrase parsing requests will not be selected to authenticate that user.

Figure 2:
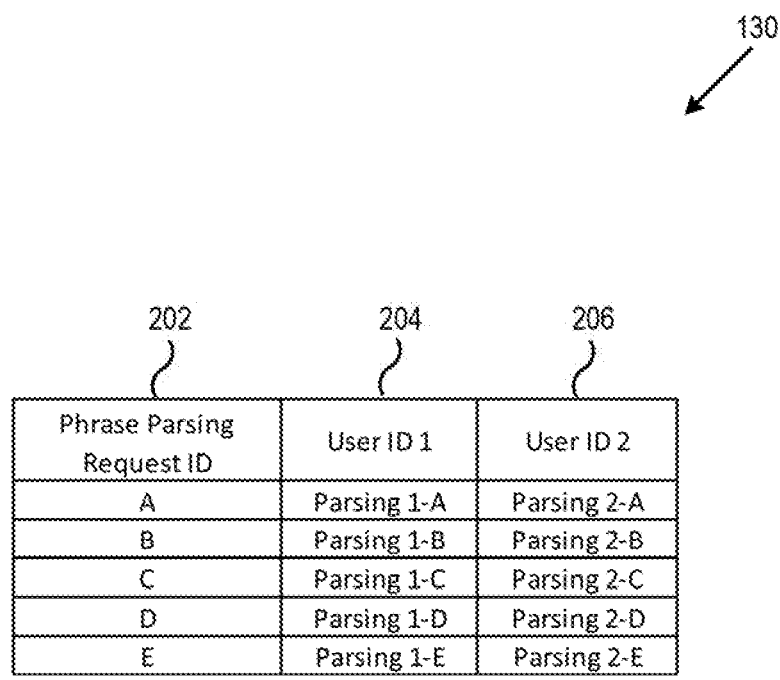
FIG. 2 illustrates an example database of phrase parsing requests according to one embodiment.

FIG. 2 illustrates an example phrase parsing bank 130. Phrase parsing bank 130 stores the phrase parsing requests 202 (or an identifier for each phrase parsing request), along with results of the phrase parsing requests for the passphrases provided by the users. As an example, a first user is assigned User ID 1, and the results of this user's passphrase parsings are stored as parsings 204. Each parsing result is associated with its respective phrase parsing. A second user is assigned User ID 2. The results of the second user's passphrase parsings are stored as parsings 206. Any number of users and parsing requests may be stored in phrase parsing bank 130.

To continue the example implementation of one embodiment, the user enters the passphrase "The quick brown fox jumps over the lazy dog." In this embodiment, this example passphrase passed all of the requirements for passphrases enforced by the server. In a real-word implementation, this passphrase may be rejected because it is a common, well-known phrase, and the service provider may have implemented a rule to reject a list of well-known passphrases. However, it will suffice as an example herein. When the user enters this passphrase, the server parses the passphrase using the requests from the phrase parsing request database 120. Each phrase parsing request has an associated identifier, and those identifiers are stored in phrase parsing request ID 202 of phrase parsing bank 130. The passphrase itself is not stored by the server. Instead, the passphrase is discarded. The parsing results may be one-way hashed and stored on the server in some embodiments. The user's login ID, along with the phrase parsing request ID 202, is used to locate the parsing in the database. In one embodiment, this could be performed using a junction table in the database.

In this example, the user is provided User ID 1, and the parsing results for the user's passphrase are stored in phrase parsing bank 130, illustrated by column 204.

A few example phrase parsing requests are provided.

Phrase parsing request A: "Concatenate, in word order, the first letter of each word in the phrase."

Phrase parsing request B: "Concatenate, in word order, the first and last letters of each word in the phrase."

Phrase parsing request C: "Concatenate, in word order, the third letter of every word with more than three letters, then append the last letter of every word."

Phrase parsing request D: Concatenate, in word order, the second letter of every word with at least two letters, then append, in word order, the number of letters in each word."

When the passphrase is received by the server at account creation time, the passphrase is parsed with the phrase parsing requests in the phrase parsing request database 120, and the results are stored in phrase parsing bank 130. Assume we have only the four phrase parsing requests above. The results stored in phrase parsing bank 130 for User 1 are as follows:

| Phrase Parsing Request ID | User ID 1 | User ID 2 |
|---|---|---|
| A | tqbfjotld | . . . |
| B | teqkbnfxjsortelydg | . . . |
| C | iomezeknxsreyg | . . . |
| D | hurouvhao355354343 | . . . |
| . . . | . . . | . . . |

Note that the passphrase itself is not stored on the server. The results of the parsings can be one-way hashed and stored. The phrase parsing results can be retrieved by using the User ID of the user who is requesting authentication and the ID of the parsing request. When the user requests authentication, the server selects a parsing request and asks the user to enter the answer. For example, the server may choose parsing request C. The user enters the response to the parsing request (iomezeknxsreyg), and the server performs a one-way hash on the response and compares it to the value stored in the bank. If there is a match, the user is authenticated.

In one example implementation, the user is asked each phrase parsing request only one time. The user is never asked to perform that parsing again for a future login. In the example above, once the user has been asked phrase parsing request C, subsequent logins will require the user to parse the phrase using one of the other requests. If the user enters the incorrect result for phrase parsing request C, the server will choose a different phrase parsing request for another login attempt instead of asking the user to re-enter the result for request C.

The server may randomly choose which available parsing request to use. In other embodiments, a policy can be set to choose parsing requests in any order, such as according to a predetermined order or algorithm. Once all of the parsing requests have been used, or after a predetermined number or percentage of the parsing requests have been used, the user will be asked to enter a new passphrase and the phrase parsing bank will be repopulated with the results of the phrase parsings on the new passphrase. This procedure ensures that the answers to the phrase parsings are used for authentication only one time. If a "man-in-the-middle" attack occurs, and the user's answer is compromised, that answer will not be valid for any future login attempt for that User ID, because that phrase parsing will not be asked again.

As a second example implementation, the user enters the passphrase "Four score and seven years ago our fathers brought forth on this continent, a new nation." This example passphrase also passed all of the requirements for passphrases enforced by the server in this example. When the user enters this passphrase, the server parses the passphrase using the requests from the phrase parsing request database 120. The passphrase is discarded. The parsing results may be one-way hashed and stored on the server in some embodiments. In this example, the user is provided User ID 2, and the parsing results for the user's passphrase are stored in phrase parsing bank 130, illustrated by column 206.

The example phrase parsing requests A-D above will be used in this example. The results stored in phrase parsing bank 130 for User 2 are as follows:

| Phrase Parsing Request ID | User ID 1 | User ID 2 |
|---|---|---|
| A | tqbfjotld | fsasyaofbfotcann |
| B | teqkbnfxjsortelydg | frseadsnysaoorfsbtfhontsctanwnn |
| C | iomezeknxsreyg | uoeatorintrednsorsthnstawn |
| D | hurouvhao355354343 | ocneeguaronhoea4535533775249136 |
| ... | ... | ... |

The results of the parsings can be one-way hashed and stored. The phrase parsing results can be retrieved by using the User ID of the user who is requesting authentication and the ID of the parsing request. When the user requests authentication, the server selects a parsing request and asks the user to enter the answer. For example, the server may choose parsing request A for User 2. The user enters the response to the parsing request (fsasyaofbfotcann), and the server performs a one-way hash on the response and compares it to the value stored in the bank. If there is a match, the user is authenticated.

New parsing requests can be added to the database at any time. Because the original passphrase is not stored, the new parsing requests cannot be applied to existing passphrases. When the service provider or administrator determines that users should provide a new passphrase, the new parsing requests can be applied to the new passphrase.

In some embodiments, phrase parsing requests as those described above are used for infrequent logins, and not for everyday logins. For example, a user that logs into an email account multiple times a day may not want to respond to a phrase parsing request at every login. The phrase parsing requests can be long and tedious to enter. Also, the server may run out of phrase parsing requests over the course of a few days or a few weeks, requiring the user to frequently create another passphrase. However, the phrase parsing requests are more secure than a standard static password. Therefore, phrase parsing requests such as those described herein may be used for rare logins. For example, a phrase parsing request may be used to log in to a system where a user updates beneficiary information for a life insurance policy. This is the type of login that should generally be infrequent. It is also the type of login where a greater amount of security may be desired. As another example, a phrase parsing request may be used when a user desires to change a password on an account. Again, this type of action is generally infrequent, but a greater amount of security is desired.

Figure 3:
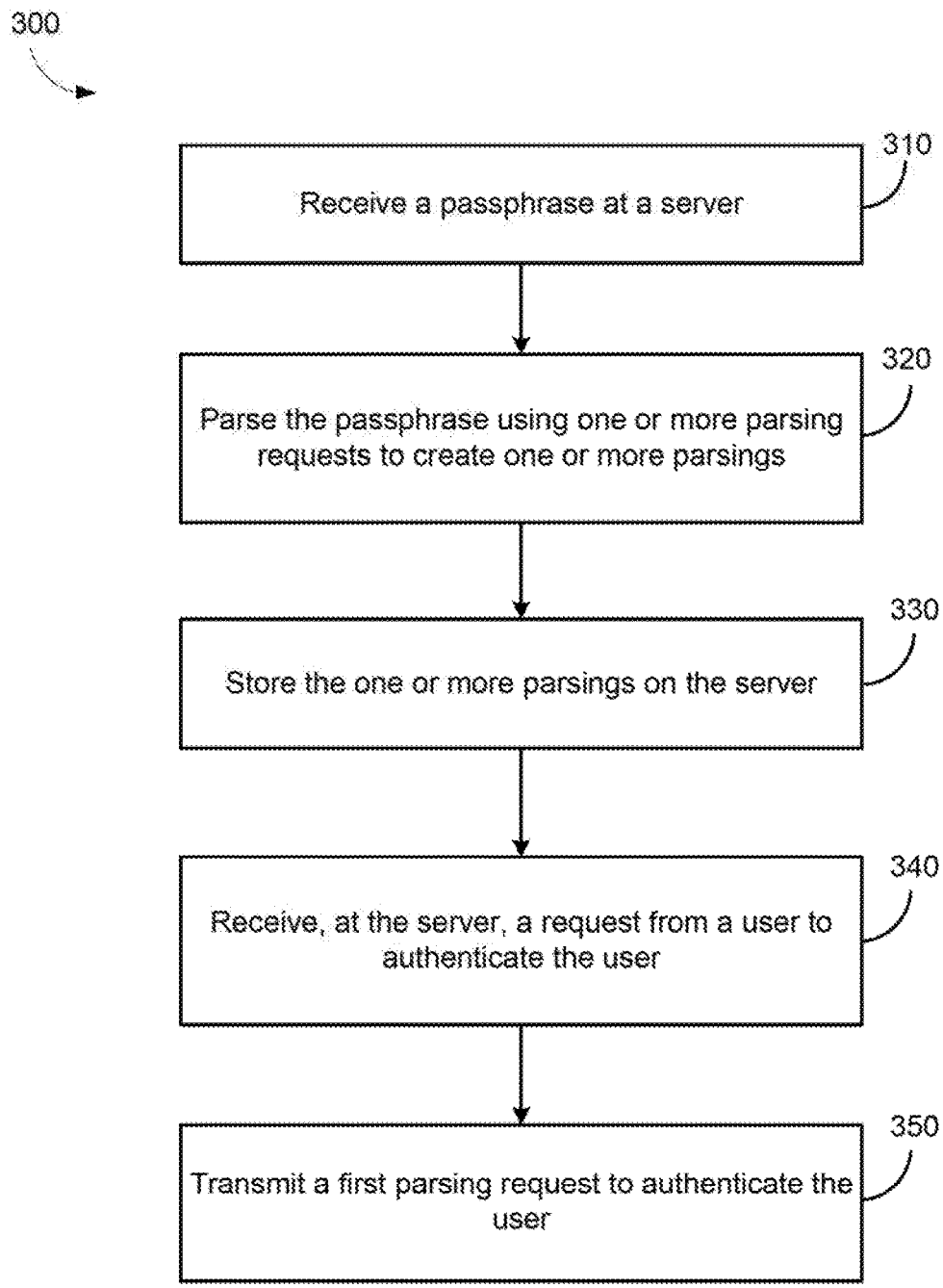
FIG. 3 is a flowchart illustrating an example method for authenticating a user.

FIG. 3 is a flow diagram that illustrates a method for authenticating users. Although the method steps are described in conjunction with the systems of FIGS. 1-2, persons skilled in the art will understand that any system configured to perform the method steps, in any suitable order, falls within the scope of the present invention. In various embodiments, the hardware and/or software elements described above in FIGS. 1-2 can be configured to perform the method steps of FIG. 3.

A method 300 begins at step 310 where a server, such as server 110, receives a passphrase entered by a user. The service provider may enforce any number of requirements on the passphrase, such as a minimum length or a certain level of complexity. If the passphrase does not meet the requirements, server 110 asks the user to enter another passphrase that meets the requirements.

The method proceeds to step 320, where the server parses the passphrase using one or more parsing requests to create one or more parsings. The parsing requests are stored in a database such as phrase parsing requests database 120. Parsing requests are generally set up by an administrator, and there could be any number of parsing requests. The service provider may also enforce any number of requirements on the parsings. Parsings that do not meet the requirements can be discarded and those parsings will not be used to authenticate that particular user. Once the parsings are created, the passphrase is deleted and is not stored on the server.

The method proceeds to step 330, where the server stores the one or more parsings that are created as a result of the phrase parsing requests. The parsings may be stored on the server or on a storage system coupled to the server. The parsings may be hashed before they are stored on the server.

The method proceeds to step 340, where the server receives a request from a user to authenticate the user. The user enters a user ID so that the server recognizes the user, and determines the location in the database of the stored parsings associated with that user ID.

At step 350, the server transmits a first parsing request to the user. The server may select the parsing request randomly or pursuant to a predetermined algorithm. Each parsing request is only used one time for each user. To log in to the requested resource, the user answers the parsing request, and the user's answer is hashed and compared to the hash of the parsing stored on the server. If there is a match, access is granted to the user. If there is not a match, the server selects another parsing request and presents that parsing request to the user.

Figure 4:
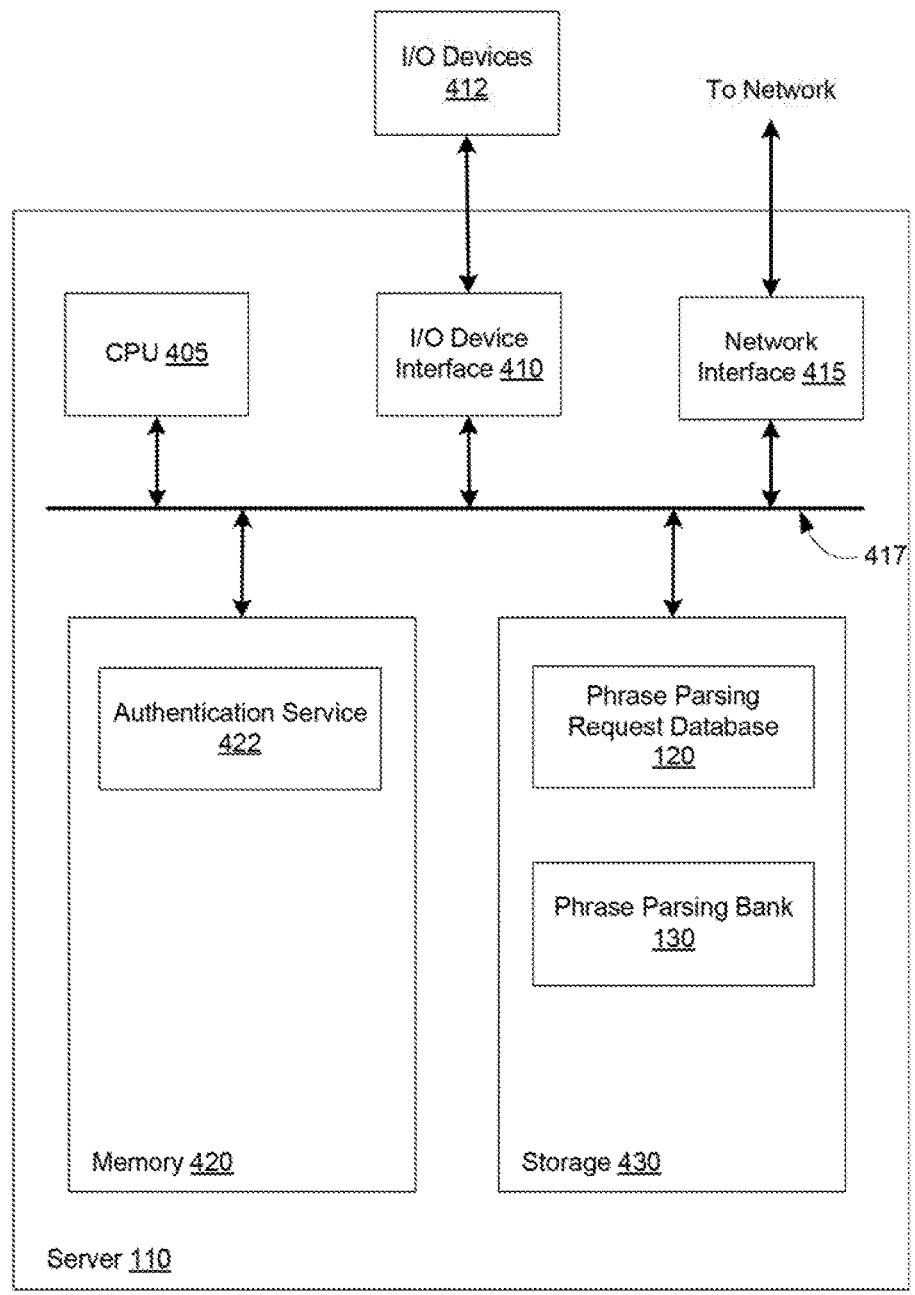
FIG. 4 is an example server 110 configured to provide authentication of a user.

FIG. 4 illustrates a more detailed example of server 110 configured to provide authentication of a user, according to one embodiment. As shown, the server 110 includes, a central processing unit (CPU) 405, a network interface 415, a memory 420, and storage 430, each connected to a bus 417. The server 110 may also include an I/O device interface 410 connecting I/O devices 412 (e.g., keyboard, display and mouse devices) to server 110. Further, in context of this disclosure, the computing elements shown in server 110 may correspond to virtualized components of a server instance hosted in a cloud network. In other embodiments, server 110 may correspond to a physical computing system.

CPU 405 retrieves and executes programming instructions stored in memory 420 as well as stores and retrieves application data residing in the storage 430. The bus 417 is used to transmit programming instructions and application data between CPU 405, I/O devices interface 410, storage 430, network interface 417, and memory 420. Note, CPU 405 is included to be representative of a single CPU, multiple CPUs, a single CPU having multiple processing cores, and the like. Memory 420 is generally included to be representative of a random access memory. Storage 430 may be a disk drive storage device. Although shown as a single unit, storage 430 may be a combination of fixed and/or removable storage devices, such as fixed disc drives, removable memory cards, or optical storage, network attached storage (NAS), or a storage area-network (SAN).

Illustratively, memory 420 includes an authentication service 422. Storage 430 includes a phrase parsing request database 120 and a phrase parsing bank 130, as described above with respect to FIG. 1. Authentication service 422 is an application that manages phrase parsing and user authentication according to embodiments described herein.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an authentication system) or related data available in the cloud. For example, the authentication system could execute on a computing system in the cloud and In such a case, the authentication system could provide phrase base authentication and store the phrase parsings described above at a storage location in the cloud. Doing so allows a user to access this information from any computing system attached to a network connected to the cloud (e.g., the Internet).

While the foregoing is directed to embodiments of the present disclosure, other and further embodiments of the present disclosure may be devised without departing from the basic scope thereof, and the scope thereof is determined by the claims that follow.

What is claimed is:

1. A method for authenticating users, comprising:
receiving a passphrase at a server;
parsing the passphrase using one or more parsing requests to create one or more parsings;
storing the one or more parsings on the server;
receiving, at the server, a request from a user to authenticate the user;
transmitting a first parsing request to authenticate the user;
receiving a response to the first parsing request and comparing the response to a parsing stored on the server, wherein the parsing is associated with the parsing request;
authenticating the user if the response to the first parsing request matches the parsing stored on the server; and
transmitting a second parsing request to authenticate the user if the response to the first parsing request does not match the parsing stored on the server.

2. The method of claim 1, further comprising:
after receiving the passphrase at the server, verifying that the passphrase meets one or more requirements.

3. The method of claim 1, further comprising verifying that each of the one or more parsings meets one or more requirements.

4. The method of claim 1, wherein the server randomly selects which of the one or more parsing requests to transmit to authenticate the user.

5. The method of claim 1, wherein the server selects which of the one or more parsing requests to transmit to authenticate the user according to a predetermined order.

6. The method of claim 1, further comprising deleting the passphrase at the server after creating one or more parsings.

7. The method of claim 1, further comprising hashing the one or more parsings before storing the one or more parsings on the server.

8. The method of claim 7, further comprising:
hashing the response to the first parsing request; and
comparing the hashed response to the hashed parsing associated with the first parsing request.

9. The method of claim 1, further comprising associating each parsing stored on the server with an identifier (ID) that corresponds to the parsing request that created the parsing.

10. An authentication system, comprising:
a processor; and
a memory, wherein the memory includes a program executable in the processor to perform operations for authenticating users, the operations comprising:
receiving a passphrase at a server;
parsing the passphrase using one or more parsing requests to create one or more parsings;
storing the one or more parsings on the server;

receiving, at the server, a request from a user to authenticate the user;

transmitting a first parsing request to authenticate the user;

receiving a response to the first parsing request and comparing the response to a parsing stored on the server, wherein the parsing is associated with the parsing request;

authenticating the user if the response to the first parsing request matches the parsing stored on the server; and transmitting a second parsing request to authenticate the user if the response to the first parsing request does not match the parsing stored on the server.

11. The system of claim 10, wherein the operations further comprise deleting the passphrase at the server after creating one or more parsings.

12. The system of claim 10, wherein the operations further comprise hashing the one or more parsings before storing the one or more parsings on the server.

13. A computer program product for authenticating a user, said computer program product comprising:

a non-transitory computer readable storage medium having stored thereon:

first program instructions executable by a processor to cause the processor to receive a passphrase at a server;

second program instructions executable by the processor to cause the processor to parse the passphrase using one or more parsing requests to create one or more parsings;

third program instructions executable by the processor to cause the processor to store the one or more parsings on the server;

fourth program instructions executable by the processor to cause the processor to receive, at the server, a request from a user to authenticate the user;

fifth program instructions executable by the processor to cause the processor to transmit a first parsing request to authenticate a user;

sixth program instructions executable by the processor to cause the processor to receive a response to the first parsing request and compare the response to a parsing stored on the server, wherein the parsing is associated with the parsing request;

seventh program instructions executable by the processor to cause the processor to authenticate the user if the response to the first parsing request matches the parsing stored on the server; and eighth program instructions executable by the processor to cause the processor transmitting a second parsing request to authenticate the user if the response to the first parsing request does not match the parsing stored on the server.

14. The computer program product of claim 13, further comprising:

ninth program instructions executable by the processor to cause the processor to delete the passphrase at the server after creating one or more parsings.

* * * * *